United States Patent [19]

Sawai

[11] 3,917,336

[45] Nov. 4, 1975

[54] GLASS HANDLING TONGS

[75] Inventor: Joe Y. Sawai, Dearborn Heights, Mich.

[73] Assignee: Ford Motor Company, Dearborn, Mich.

[22] Filed: Aug. 2, 1974

[21] Appl. No.: 494,268

[52] U.S. Cl. ............................. 294/118; 294/106
[51] Int. Cl.² ........................................... B66C 1/48
[58] Field of Search ........... 294/86 R, 86 LS, 87.22, 294/87.24, 88, 103 CG, 106, 115, 118; 214/1 BD, 1 BV, 147 G

[56] References Cited
UNITED STATES PATENTS

| | | | |
|---|---|---|---|
| 1,733,547 | 10/1929 | Lorenz............................ | 294/118 X |
| 1,931,700 | 10/1933 | Murphy et al. ................. | 294/118 X |
| 2,476,169 | 7/1949 | White et al. .................... | 294/118 X |
| 2,902,281 | 9/1959 | Scherzinger .................... | 294/118 X |
| 2,974,995 | 3/1961 | Calhoun ......................... | 294/103 CG |
| 3,232,446 | 2/1966 | Spurr et al. ..................... | 214/1 BD |
| 3,701,328 | 10/1972 | Frost ............................... | 214/1 BD X |

Primary Examiner—Richard A. Schacher
Assistant Examiner—Johnny D. Cherry
Attorney, Agent, or Firm—William E. Johnson; Keith L. Zerschling

[57] ABSTRACT

Glass handling tongs are disclosed for use in holding a glass bracket generally in a vertical plane. The tongs are designed to be self adjusting in the sense that they will reposition themselves to grip a glass bracket which has been formed so as to have a vertical curvature therein. The tongs reposition themselves to grip the glass bracket generally on a tangent to the radius of curvature developed in the glass in a glass forming operation whereby a defect known as tong kinks is eliminated.

2 Claims, 3 Drawing Figures

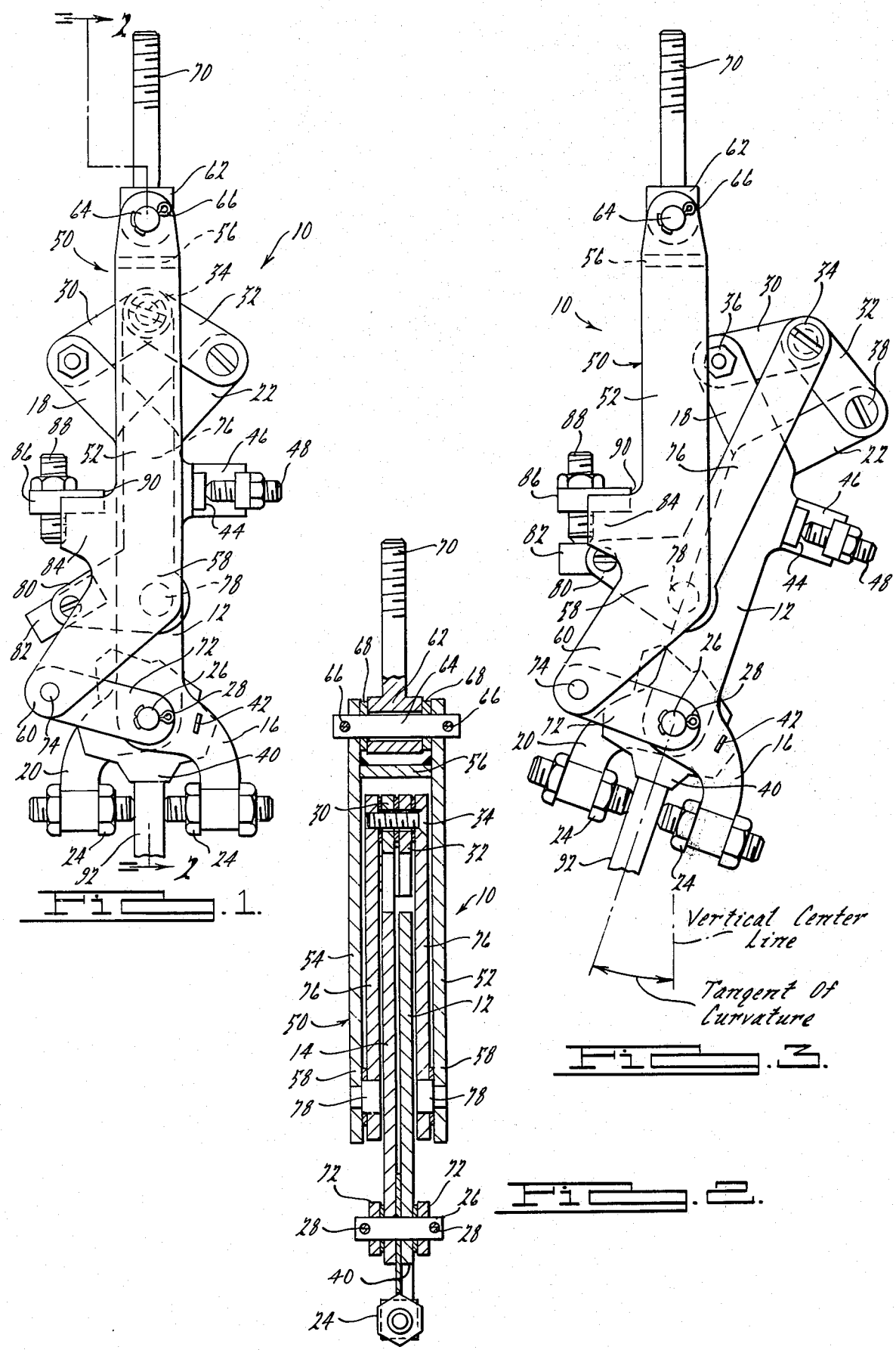

GLASS HANDLING TONGS

BACKGROUND OF THE INVENTION

Some of the side glass used in automotive glazing is glass which is shaped in a press forming operation. In the press forming operation, a heat softened flat glass bracket is formed between die surfaces to a shape generally having a vertical curvature from the top edge to the bottom edge thereof. After forming, the hot glass bracket is quenched to temper the same. In the press forming operation, the flat glass bracket is generally suspended by a pair of glass tongs at opposite upper corners. Prior to the press forming operation, the glass bracket extends downwardly in a vertical plane below the tongs. After the press forming operation, the glass bracket has a certain amount of vertical curvature therein and the center of gravity thereof is displaced from the original plane extending directly below the supporting tongs.

Present day glass handling tongs for a press forming operation are not movable from a vertical position. The gripping points of the tongs are directed downwardly in a vertical plane below the tongs and they do not grip the glass bracket on a tangent to the radius of curvature which is formed into the bracket in the glass forming operation. Because of the improper gripping angle, a defect known as tong kinks occurs in the area gripped by the tongs. Tong kinks occur because the curved glass bracket has its center of gravity displaced from the vertical plane below the tongs and therefore applies a force to the glass in the localized gripping area which causes the heated glass bracket to deform in that area. The tong kinks can cause localized stress patterns which result in breakage of the glass during the glass tempering operation or other difficulties in shipping and installing the tempered glass bracket.

It is a principal object of this invention to provide glass handling tongs which will adjust to the radius of curvature developed in a glass bracket in a glass forming operation so as to eliminate tong kinks.

SUMMARY OF THE INVENTION

This invention relates to glass handling tongs and, more particularly, to glass handling tongs which adjust to the radius of curvature developed in a glass bracket in a glass forming operation so that the glass bracket is gripped at a tangent to the radius of curvature developed therein in the forming operation.

In accordance with this invention a glass handling tongs includes first and second clamping members which have lower clamping portions and upper supporting portions. A first mounting device is provided for mounting the clamping members with their clamping portions in an opposed relationship and with their supporting portions movable in such a manner that their clamping portions are movable into and out of a gripping relationship with a glass bracket. A support frame includes a first side member and a second side member which are joined at the top by a cross member. The side members have a support portion extending at a slight angle to a principal portion thereof. Structure is provided for mounting the support frame in a vertical plane. Second mounting devices including structure secured to the support portions of the first and second side members of the support frame are provided for pivotably mounting the clamping members and their associated first mounting devices for movement to and from one side of the support frame.

When the glass handling tongs grip a flat bracket of glass, the first and second clamping members of each tong stay in a vertically aligned position with respect to the support frame. The first mounting device permits the clamping members to open and close upon the glass bracket to be held therebetween. When the glass bracket is formed in a glass forming operation such as a press forming operation, the second mounting structure permits the first and second clamping members to pivot with respect to the support frame to a position which is tangent to the radius of curvature developed in the glass bracket by the glass forming operation. This pivoting action eliminates the stresses which would have been placed at the tong gripping points if the tongs had remained in a vertically aligned position with respect to the support frame of the glass handling tongs.

BRIEF DESCRIPTION OF THE DRAWINGS

FIG. 1 is a side elevation view of the glass handling tongs of this invention in a position wherein the clamping members are vertically aligned with the support frame.

FIG. 2 is a front elevational view, partly in cross section, taken along line 2—2 of FIG. 1.

FIG. 3 is a side elevational view similar to FIG. 1 but showing the clamping members in a pivoted position in which they are gripping a glass bracket formed to a curved configuration.

DESCRIPTION OF THE PREFERRED EMBODIMENT

Construction

In the drawings there is seen glass handling tongs, generally designated by the numeral 10, formed in accordance with the teachings of this invention. The tongs include a first clamping member 12 and a second clamping member 14, only the full extent of the first clamping member being visible in FIGS. 1 and 3. The first clamping member has a central leg, a depending clamping leg 16 and a support leg 18. Similarly, the second clamping member 14 has a central leg, a depending clamping leg 20 and a support leg 22. In both cases, the clamping legs and the support legs extend generally in opposite directions from opposite ends of the central portions of the clamping members. The free ends of the clamping legs are provided with adjustable glass gripping tongs 24 of known construction.

A pivot pin 26 secures the first clamping member 12 and the second clamping member 14 pivotally to one another at a location on the central portion of each of the members adjacent the clamping legs 16 and 20 thereof so that the gripping tongs 24 mounted thereon are in facing relationship. Cotter pins 28 are used to hold the pivot pin 26 in place. A pair of links 30 and 32 are movably connected together at one end by a screw 34. The other end of the link 30 is movably connected by a nut and bolt arrangement 36 to the free end of the support leg 18 of the first clamping member 12. Similarly, a nut and bolt arrangement 38 movably connects an end of the link 32 to the support leg 22 of the second clamping member 14. Through the arrangement of the pivot pin 26, and the movable connections of the links 30 and 32 to the clamping legs 12 and 14, any movement of the clamping members in a direction which causes the pivot pin 26 to move towards the screw 34 will cause an opening of the glass gripping tongs 24 while movement in the opposite direction will cause a closing of the tongs.

A glass gauging device 40 is provided between the lower ends of the first and the second clamping members 12 and 14 and is pinned to the depending leg 16 of the first clamping member by a cotter pin 42 so as to be in a fixed position with respect to the adjustable gripping tongs 24. When an operator inserts glass bracket between the gripping tongs, the operator presses an edge of the bracket against the tongs and pushes upwardly causing the tongs to separate them a distance sufficient to permit the bracket to move therebetween. The bracket moves between the tongs until the edge engages the glass gauging device 40 to limit its movement. The operator then moves the glass bracket downwardly at a slow rate permitting the glass clamping member to also move downwardly and move the gripping tongs into engagement with the glass bracket.

As best seen in FIGS. 1 and 3, a stop surface 44 is provided on the first clamping member 12 near its upper support leg 18. An extension 46 is provided on the second clamping member 14 adjacent the stop surface 44. This extension carries an adjustable screw 48 which engages the stop surface 44 to limit the travel of the first and second clamping members 12 and 14 to a gripping position. One may adjust the glass tongs 10 to accommodate various thickness of glass by adjusting the adjustable gripping tongs 24 and the adjustment bolt 48 to the size desired.

The glass handling tongs 10 also include a support frame indicated generally by the numeral 50. The frame includes a first side member 52 and a second side member 54. These side members are joined at their top by a cross brace 56. These side members also have a downwardly extending leg which are joined at a junction portion 58 to an angularly extending leg 60.

An eye bolt 62 is secured by a pivot pin 64 and cotter pins 66 to the upper portions of the side members 52 and 54. Washers 68 are provided for proper spacing of the eye bolt with respect to the side members. The eye bolt has a threaded portion 70 which is used to secure it to an overhead conveyor.

A pair of lower links 72, only the front one of which is shown in FIGS. 1 and 3, are individually secured at one end thereof by a pin 74, to the free end of the angularly extending leg 60 of the first side member 52 and the second side member 54. The other end of each of the lower links 72 is secured by the pivot pin 26 adjacent the clamping leg 16 and 20 respectively of the first and second clamping members 12 and 14. A pair of upper links 76, only the front one of which is shown in FIGS. 1 and 3, are also provided. The lower end of each of the upper links is pivotably secured by pivot pin 78 to the junction portion 58 of either the first or the second side member. The upper end of each of these upper links is pivotably secured to the screw 34 connecting the links 30 and 32.

The upper links 76 each have an extension 80 thereon which carries a stop device 82 therebetween. Extensions 84 are provided on both the first side member 52 and the second side member 54 for supporting a member 86 therebetween. This member 86, in turn, carries an adjustment bolt 88 thereon. The adjustment bolt 88 and the stop device 82 cooperate with one another in order to limit the degree to which the first and second clamping members 12 and 14 may be pivoted with respect to the support frame 50. The member 86 also has an inside surface 90 which may be contacted by one of the clamping members 12 or 14 to position the clamping members in a vertically aligned position with respect to the support frame.

Operation

In operation, the glass handling tongs 10 of this invention are secured by the threaded portion 70 of the eye bolt 62 to a chain conveyor which passes from a loading station through a glass heating station, a glass forming station, a glass quenching station and a glass unloading station. At the glass loading station, the tongs are generally in the position shown in FIG. 1. A glass bracket 92 is mounted between the adjustable glass gripping tongs 24 by pushing the glass bracket upwardly into engagement with the tongs. Initially there is insufficient space between the tongs to permit the glass to be received therebetween. However, pushing on the tongs moves the pivot pin 26 toward the screw 34 thereby opening the clamping legs 16 and 20. The glass bracket eventually has sufficient space between the tongs 24 to move upwardly into contact with the glass gauging device 40 which positions the glass properly with respect to the tongs. Once the operator feels the glass engaging the gauging device, he slowly lowers the glass permitting the clamping members 12 and 14 to move downwardly and the tongs inwardly to grip the glass securely therebetween. The glass bracket is now ready for movement into the glass forming station after it has been heated.

In the glass forming station, dies come into contact with the glass bracket in order to fabricate it into a finished shape having a curved configuration. As will best be seen in FIG. 3, the center line of the glass sheet of the finished shape is at a tangent to the vertical center line. The glass gripping tongs 10 of this invention generally grips the glass bracket along this tangent line. This gripping action is achieved because the lower link 72 and the upper link 76 permit the first and second clamping member 12 and 14 to pivot in a direction which compensates for the curvature of the gripped glass. In this manner, the gripping tongs do not place pressure on the glass bracket and they do not form tong kinks in the softened glass. As shown in FIG. 3, the stop device 82 is in contact with the adjustable bolt 88 in order to limit the pivotable movement of the first and the second clamping members. The device of this invention, however, needs not pivot to this full stop position as it may pivot only to an intermediate position determined by the radius of curvature of the glass and the weight of the glass. Thus the device can accommodate many different weights of glass having different radii of curvature formed therein and still adjust itself so as to be aligned on the tangent rather than gripping the glass at some other angle.

In view of this description, those skilled in the art will be able to modify this invention without departing from the true spirit thereof. It is intended that all such modifications fall within the scope of the appended claims.

I claim:

1. Glass handling tongs which comprise:
   a first clamping member and a second clamping member, each of said clamping members having a central leg, a depending clamping leg, and an extending support leg, said clamping leg and said support leg extending in generally opposite directions from opposite ends of said central legs;

a pivot pin securing said clamping members together at a location on said central legs of said clamping members adjacent said clamping legs thereof, whereby said clamping legs are in spaced relationship;

a pair of links connected at one end to each other and at the other end respectively to one of said support legs of said clamping members whereby movement of said links open and closes said clamping leg of said clamping members;

a support frame including a pair of side members joined at the top by a cross member, each of said side members having a downwardly extending leg and an angularly extending leg joined to the lower part of said downwardly extending leg at a junction portion;

structure means for mounting said support frame in a vertical plane;

a pair of lower links;

first pivot connection means for pivotally securing one end of each of said lower links to the free end of one of said angularly extending legs of said side members of said support frame, the other end of each of said links being pivotally connected to said pivot pin securing said clamping members together;

a pair of upper links;

second pivot connection means for pivotally securing one end of each of said upper links to said junction portion of respective ones of said downwardly extending legs of said side members of said support frame, the other end of each of said upper links being pivotally connected to the interconnection of said pair of links whereby said support legs of said clamping members are pivotable between a vertically aligned position and an angularly aligned position with respect to said support frame.

2. The glass handling tongs of claim 1 wherein:

said support frame further includes a pair of stop surfaces, one stop surface being contacted by at least one of said clamping members to align said clamping member in a vertical relationship with respect to said support frame, the other of said stop surfaces limiting the position to which said clamping members may be pivoted with respect to said support frame.

* * * * *